United States Patent [19]

Elswood et al.

[11] 4,266,287
[45] May 5, 1981

[54] TRANSDUCER SYSTEMS WITH CONTROLLED DAMPING

[75] Inventors: Ebbert L. Elswood, Sierra Madre; Wyndall O. Reynolds, Monrovia, both of Calif.

[73] Assignee: Bell & Howell Company, Chicago, Ill.

[21] Appl. No.: 30,204

[22] Filed: Apr. 16, 1979

[51] Int. Cl.³ .......................................... H04R 11/00
[52] U.S. Cl. .................................... 367/185; 367/171
[58] Field of Search ............... 340/17 R, 8 LF, 8 PC; 367/171, 172, 185, 187

[56] References Cited

U.S. PATENT DOCUMENTS

| | | |
|---|---|---|
| 2,615,940 | 10/1952 | Williams . |
| 2,717,369 | 9/1955 | Bardeen et al. ............... 340/17 R |
| 2,782,394 | 2/1957 | Hardway, Jr. .................. 340/8 PC |
| 2,915,738 | 12/1959 | Vogel ............................. 340/17 R |
| 3,108,247 | 10/1963 | Harris ............................ 340/8 PC |
| 3,237,152 | 2/1966 | Cox ................................ 340/8 PC |
| 3,662,327 | 5/1972 | White ............................. 340/8 LF |
| 4,110,731 | 8/1978 | Elswood ......................... 340/17 R |

FOREIGN PATENT DOCUMENTS

| | | |
|---|---|---|
| 762680 | 12/1956 | United Kingdom . |
| 771048 | 3/1957 | United Kingdom . |
| 771663 | 4/1957 | United Kingdom . |
| 1055681 | 1/1967 | United Kingdom . |
| 1067823 | 5/1967 | United Kingdom . |
| 1367285 | 9/1974 | United Kingdom . |
| 1556327 | 11/1979 | United Kingdom . |

*Primary Examiner*—Theodore M. Blum
*Attorney, Agent, or Firm*—Benoit Law Corporation

[57] ABSTRACT

The damping of transducers having a mass oscillating in the manner of a piston in a cylinder containing damping fluid on both sides of the cylinder is rendered adjustable by the provision of a conduit through the mass for the flow of damping fluid from and to either side of the oscillating mass. An adjustable valve is preferably provided in a part of that conduit for damping control through regulation of damping fluid flow.

25 Claims, 4 Drawing Figures

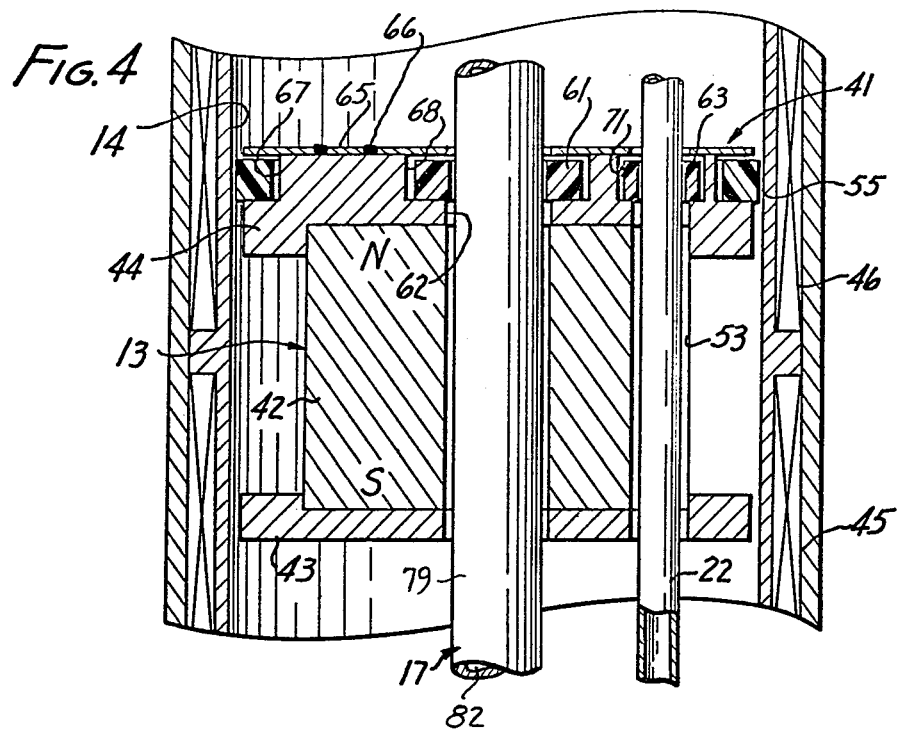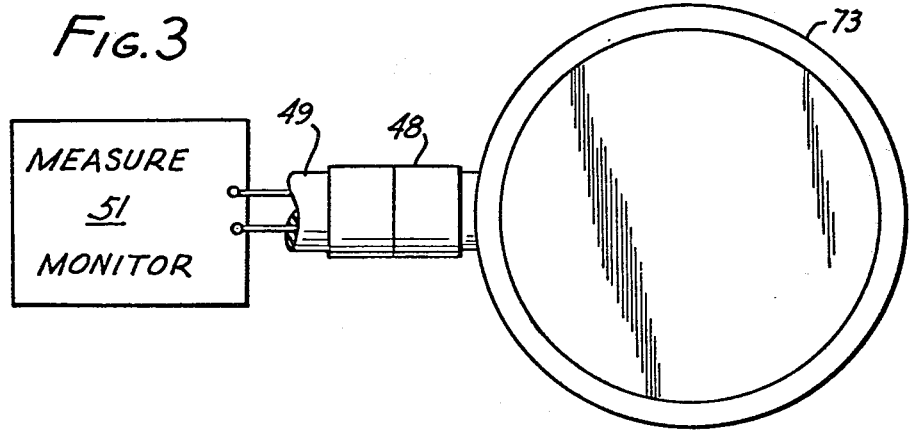

TRANSDUCER SYSTEMS WITH CONTROLLED DAMPING

BACKGROUND OF THE INVENTION

1. Field of the Invention

The subject invention relates to transducing methods and transducers and, more specifically, to transducers of the type having a mass oscillating in the manner of a piston in a cylinder, and to methods for operating such transducers, as well as to systems for adjusting the damping of transducers.

2. Disclosure Statement

This disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material.

Transducer systems pertinent to this disclosure statement are apparent from U.S. Pat. No. 4,110,731 for Vibration Transducer With Improved Viscous Damping, by Ebbert Lee Elswood, issued Aug. 29, 1978 to the subject assignee, and herewith incorporated by reference herein, and from the art of record or otherwise cited in that Elswood patent and also incorporated by reference herein.

In the course of a novelty search, four patents were noted, comprising U.S. Pat. No. 2,615,940, by M. Williams, disclosing electrokinetic transducing methods and apparatus having transducer elements located in a conduit or other passage between two fluid chambers, U.S. Pat. No. 2,717,369, by T. Bardeen et al, disclosing a pressure-sensitive deep well seismograph detector, providing free fluid flow by holes in a partition wall located between a pair of fluid chambers and encompassing an electric transducer, U.S. Pat. No. 2,915,738, by C. B. Vogel, which discloses a hydrophone detector providing for fluid leakage around a pressure-sensing diaphragm in reponse to excess pressure, and U.S. Pat. No. 3,662,327, by G. White, which discloses a seismometer wherein pressure transducing elements are disposed in a passage through a seismic mass or in a conduit around the seismic mass located between two fluid chambers.

Among the transducer systems so far mentioned, there persists a need for a generally applicable and efficiently operable damping adjustment system. In this respect, the above mentioned Elswood patent discloses a damping adjustment approach which has worked reasonably well in practice. In particular, Elswood achieved a measure of damping control by building the transducer for the maximum damping required in a given range of applications, and by then calibrating the transducer damping downwardly as required, by a cutting of notches into, or formation of similar peripheral recesses on, a piston ring on the outside of the seismic mass.

While that approach has proved its utility in numerous applications, it does present the drawback of requiring damping adjustments to be done by manual material removing operations, involving typically a repeated assembly, testing and disassembly procedure for damping each unit properly. Also, overadjustment resulted in wastage since a removal of too much material generally could only be undone by replacement of the particular part. Moreover, the careful attention of highly skilled personnel was continuously required throughout the elaborate damping adjustment procedure.

SUMMARY OF THE INVENTION

It is a general object of this invention to overcome the disadvantages and to satisfy the needs expressed or implicit in the above mentioned disclosure statement.

It is a related object of this invention to provide transducers with improved damping adjustment systems.

It is a germane object of this invention to provide improved methods of operating transducers, and to provide improved transducer systems.

It is a related object of this invention to provide vibration transducers with improved damping facilities.

It is a related object of this invention to provide improved vibration transducers using gaseous or similar low-viscosity damping media.

It is a further object of this invention to increase the operating range of transducers, particularly in terms of environmental temperatures, and to increase transducer life.

Other objects of this invention will become apparent in the further course of this disclosure.

From a first aspect thereof, the subject invention resides in a method of operating a transducer having a mass oscillating in the manner of a piston in a cylinder having a first chamber region containing damping fluid on a first side of the mass and a second chamber region containing damping fluid on an opposite second side of the mass. The invention as to this aspect resides, more specifically, in the improvement comprising, in combination, the steps of providing a conduit through the mass, interconnecting the first and second chamber regions through that conduit, oscillating the mass and flowing damping fluid through the conduit with the oscillating mass and generating electric signals in response to oscillation of the mass.

In the practice of this method, the damping of the oscillating mass is adjusted by adjusting the flow of damping fluid through the conduit. By way of example, the damping of the oscillating mass is increased by restricting the conduit in effective cross-section.

By way of background, the seismic mass or piston in the transducer cylinder oscillates in that cylinder relative to the attached vibrating apparatus or structure into the resonance region of the transducer. Above the resonance or natural frequency of the system, the mass or piston tends to become relatively stationary and the cylinder appears to oscillate relative to the mass. Accordingly, expressions such as "oscillating," "axial oscillation in the cylinder means" and other statements suggesting movement of the mass or piston, as herein employed, are to be understood in terms of relative movement between mass or piston and cylinder or other structure.

From another aspect thereof, the subject invention resides in a transducer having a mass oscillating in the manner of a piston in a cylinder having a first chamber region containing damping fluid on a first side of said mass and a second chamber region containing damping fluid on an opposite second side of the mass. According to this aspect, the invention resides, more specifically, in the improvement comprising a conduit through the mass interconnectihg the first and second chamber regions for the flow of damping fluid upon oscillation of the mass and means connected to the mass for generating electric signals in response to oscillation of the mass.

In the practice of this aspect of the invention, means may be connected to the conduit for maintaining the conduit stationary relative to the oscillating mass. Means may be included for adjusting or increasing the damping of the oscillating mass by adjusting or restricting the conduit in effective cross-section or by otherwise adjusting the flow of damping fluid through the conduit.

From another aspect thereof, the subject invention resides in a vibration transducer comprising, in combination, cylinder means for enclosing a viscous damping medium, piston means in the cylinder means having an outside diameter smaller than the inside diameter of the cylinder means, having a seismic mass, and dividing the cylinder means into a first chamber region containing part of the damping medium on a first side of the mass and a second chamber region containing more of the damping medium on an opposite second side of the mass, means for mounting said piston mass for axial oscillation in the cylinder means, means for damping the oscillation of the piston means with the viscous damping medium, including a piston ring having an outside diameter larger than the outside diameter of the piston means to impede flow of the viscous damping medium relative to the oscillating piston means, but smaller than the inside diameter of the cylinder means to provide clearance between said piston ring and the cylinder means, means for controlling the damping including a conduit through the piston means interconnecting the first and second chamber regions for the flow of damping fluid upon oscillation of the mass, and means connected to the conduit for selectively adjusting the damping fluid flow through the conduit, and means operatively associated with the piston means for sensing the damped oscillation.

From another aspect thereof, the subject invention resides in a vibration transducer comprising, in combination, cylinder means for enclosing a viscous damping medium, piston means in the cylinder means having an outside diameter smaller than the inside diameter of the cylinder means, having a first bore, and having a seismic mass, and dividing the cylinder means into a first chamber region containing part of the damping medium on a first side of the mass and a second chamber region containing more of the damping medium on an opposite second side of the mass, means including a post extending through the first bore for mounting the piston means for axial oscillation in the cylinder means, means for damping the oscillation of the piston means with the viscous damping medium, including a piston ring having an outside diameter larger than the outside diameter of the piston means to impede flow of the viscous damping medium relative to the oscillating piston means, but smaller than the inside diameter of the cylinder means to provide clearance between the piston ring and the cylinder means, means for controlling the damping including a second bore through the post communicating via apertures in the post with the first and second chamber regions for the flow of damping fluid through the second bore upon oscillation of the mass, and means connected to the conduit for selectively adjusting the damping fluid flow through the second bore, and means operatively associated with the piston means for sensing the damped oscillation.

From another aspect thereof, the subject invention resides in a vibration transducer comprising, in combination, cylinder means for enclosing a viscous damping medium, piston means in the cylinder means having an outside diameter smaller than the inside diameter of the cylinder means, having a first bore, and having a seismic mass, and dividing the cylinder means into a first chamber region containing part of the damping medium on a first side of the mass and a second chamber region containing more of the damping medium on an opposite second side of the mass, means including a post extending through the first bore for mounting the piston means for axial oscillation in the cylinder means and including spring suspension means being flexible in an axial direction in the cylinder means and having maximum stiffness at right angles to the axial direction to retain the piston means against radial movement relative to the cylinder means, means for controlling damping of the oscillation of the piston means with the viscous damping medium including a conduit between the first and second chamber regions extending through the post, and means connected to the conduit for selectively adjusting flow of damping fluid between the first and second chamber regions, and means operatively associated with the piston means for sensing the damped oscillation.

BRIEF DESCRIPTION OF THE DRAWINGS

The subject invention and the various aspects and objects will become more readily apparent from the following detailed description of preferred embodiments thereof, illustrated by way of example in the accompanying drawings, in which like reference numerals designate like or functionally equivalent parts, and in which:

FIG. 3 is a top view of the transducer shown in FIG. 1, with a block diagram of associated equipment; and FIG. 4 is an elevation similar to FIG. 1, on an enlarged scale, showing the seismic mass region of the transducer in greater detail.

DESCRIPTION OF PREFERRED EMBODIMENTS

Figure 1:
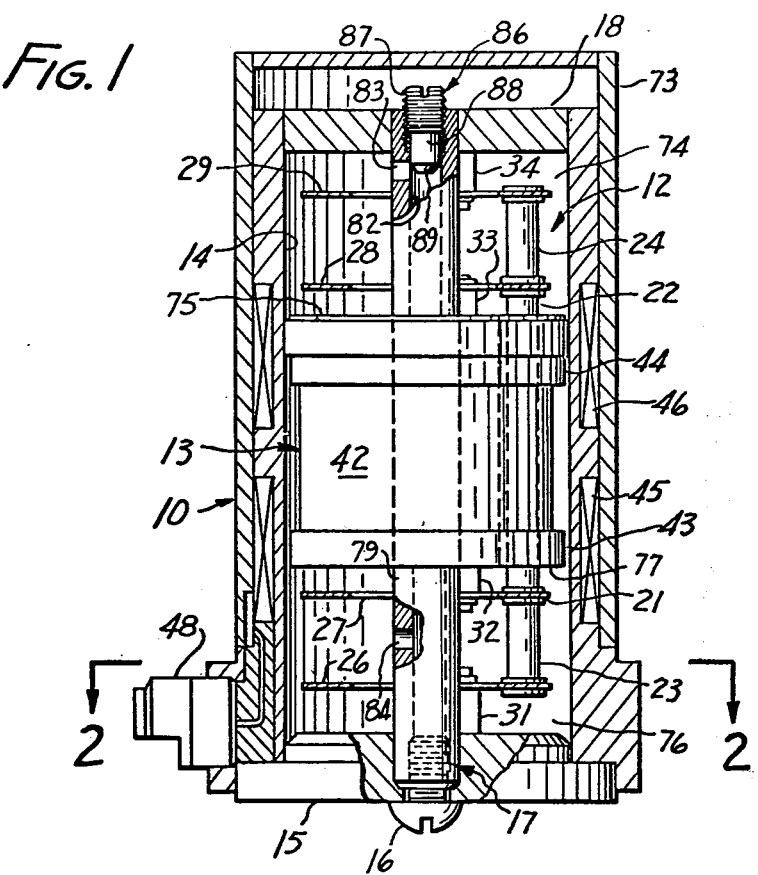
FIG. 1 is an elevation, partially in section, of a vibration transducer in accordance with a preferred embodiment of the subject invention.

The vibration or velocity transducer shown in the drawings has utility in a great variety of applications, such as seismic or vibration measurements or monitoring, velocity measurements, displacement measurements and the like. Specific applications include vibration monitoring on fans, heavy rotating machinery, aircraft and other engines, pipelines, high-temperature and other turbines, and dynamic balancing equipment. However, the subject invention and its applications are not limited to any specific field of application or, indeed, to any specific type of transducer.

The high temperature, frictionless, viscous damped velocity or vibration transducer 10 shown in the drawings has a spring suspended mass assembly 12 mounted for axial oscillation of a seismic mass 13 in a hollow-cylindrical bobbin support or cylinder 14.

In particular, the transducer 10 has a circular, stepped mounting plate 15 which may be equipped with threaded or other fasteners (not shown) for attachment to any machine or other structure the vibration, velocity, displacement or other parameter of which is to be transduced to a measurable or monitorable electric signal.

A cylindrical mounting post 17 rises from a central bore in, and perpendicularly to, the mounting plate 15 and may be attached to the mounting plate 15 by welding, brazing or any other desired technique or, preferably and as shown in FIG. 1, by means of a threaded bolt or screw 16 which, if desired, may be sunken in the plate 15 rather than projecting as shown. At its top end opposite the base mounting plate 15, the vertical post 17 carries a circular top mounting plate 18 which is heat shrunk, welded or otherwise attached to the top of the vertical post.

The top mounting plate 18 assists the base mounting plate 15 in mounting the bobbin support cylinder 14, with that cylinder 14, base mounting plate 15 and/or top mounting plate 18 constituting a means for enclosing a viscous damping fluid or medium. If desired, the parts 14, 15 and 18 may be welded or brazed into a solid unit around the mass-spring assembly 12.

If the bobbin support 14 is used as a cylinder, then the seismic mass 13 may be considered a piston oscillating axially in the cylinder 14 containing the viscous damping medium. Viewed another way, the component 13 may be used as a piston having the seismic mass of the transducer 10.

The spring suspension assembly 21 of the transducer includes a bridge 22 in the form of a rod extending between first and second end portions 23 and 24 of the bridge. As disclosed in the above mentioned Elswood patent, the bridge or rod 22 is preferably formed by a thin-walled tube to minimize the mass of the spring suspension bridge and thus the influence of that mass on the transducer output signal. Also, with the type of spring suspension used in the illustrated transducer, the travel of the bridge essentially is only one half the travel of the mass 13 during axial oscillation of that mass in the cylinder 14.

The spring-mass assembly 12 further includes four C-shaped flat leaf springs 26, 27, 28 and 29 which are preferably cut from flat leaf spring stock.

Figure 2:
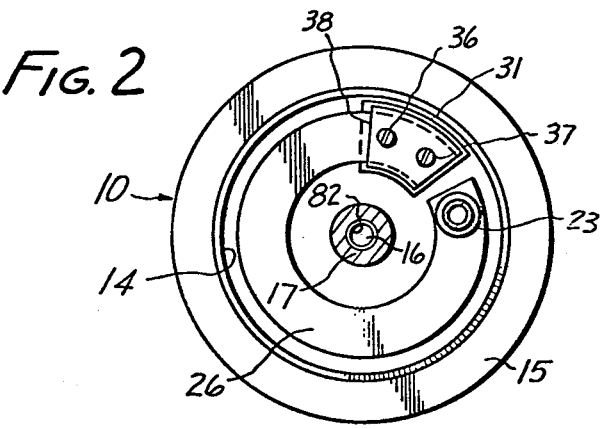
FIG. 2 is a section taken along line 2—2 in FIG. 1, with a bobbin casing and outer housing not being shown for increased clarity of the illustrated parts.

As seen in FIGS. 1 and 2, the first spring 26 is connected to and extends between the support plate 15 and the first end portion 23 of the bridge 22. The second spring 27 is connected to and extends between the mass or piston 13 and the first bridge end portion 23. The third spring 28 is connected to and extends between the mass or piston 13 and the second end portion 24 of the bridge 22. The fourth spring 29 is connected to and extends between the top support plate 18 and the second bridge end portion 24.

In particular, each of the springs 26 to 29 is brazed to the corresponding end portion of the bridge 22. Also, each of the springs 26, 27, 28 and 29 has associated therewith a mounting block or spacer 31, 32, 33 and 34, respectively.

Two screws or other fasteners 36 and 37 extend through a spring clamp 38, through the spring 26 and the mounting block or spring spacer 31 into corresponding threaded holes in the base plate 15 in order to attach the first spring 26 to that plate. The second and third springs 27 and 28 are similarly attached to the mass or piston 13 via blocks or spacers 32 and 33. The fourth spring 29 is similarly attached to the top mounting plate 18 via block or spacer 34.

Because of their illustrated configuration and mounting, the spring suspension or springs 26 to 29 are readily flexible in the axial direction of the cylinder 14 or post 17, but have or present maximum stiffness at right angles to that axial direction.

This is an important feature of the illustrated combination, in that it retains the mass or piston 13 against radial movement relative to the cylinder 14, thereby avoiding frictional scraping and sticking and contributing to the success of the floating seal damping assistance structure 41 of the subject invention.

In this respect, and as best seen in FIG. 4, the mass or piston 13 includes a cylindrical axially polarized magnet 42 extending between spaced ferromagnetic circular pole piece plates 43 and 44 which magnetically act on two inductive coils or bobbins 45 and 46 which are wound in opposite directions in corresponding recesses of the bobbin support cylinder 14 to reduce inductive pickup from stray magnetic fields and insure accurate readings of the electric signal inductively generated during vibration of the magnetic mass 13 and supplied via a transducer terminal 48 and cable 49 to electrical measurement or monitor equipment 51. Primarily, the bobbins are wound in opposite directions for maximum signal generation.

Even though the illustrated type of spring suspension can readily be manufactured to withstand transverse accelerations above 30 g and to retain its characteristics throughout rough handling of the transducer unit, care has to be taken that any friction, scraping or sticking between relatively moving and stationary parts of the transducer is affirmatively avoided. To this end, and pursuant to the teachings of the above mentioned Elswood patent, the maximum outside diameter of the mass or piston 13 at the pole pieces 43 and 44 is kept smaller than the inside diameter of the cylinder 14 so that there is sufficient annular clearance between the piston and the cylinder to exclude any contact between the two during operation or rugged handling.

Similarly, the minimum inside diameter of the mass or piston 13 at the pole piece 44 or at any other of the pieces 43 and 44 of the mass 13 is made larger than the outside diameter of the mounting post 17. The post 17 thus extends through an axial bore in the piston or mass 13 and has a diameter smaller than the smallest diameter of that bore so as to leave sufficient clearance between the piston 13 and mounting post 17 to exclude positively any contact between the two during operation or rugged handling of the transducer.

Also, the spring suspension bridge 22 is disposed and maintained at a distance from or clearance to the mass or piston 13. For instance, the bridge 22 may extend through a slot 53 and corresponding registering bores in the magnet 42 and pole pieces 43 and 44.

With these various clearances, the transducer damping potential, as well as the suitability of various damping media would still be restricted in practice.

To provide for a more effective damping and to extend the range of suitable damping media into the low viscosity range, the transducer according to the teaching of the above mentioned Elswood patent is equipped with a floating seal assembly 41, preferably providing floating seals between the mass or piston 13 on the one hand and the cylinder 14, mounting post 17 and spring suspension bridge 22, on the other hand.

In accordance with the illustrated preferred embodiment of the subject invention, the floating seal assembly 41 includes a piston ring 55 having an outside diameter larger than the maximum outside diameter of the mass or piston 13 to impede flow of the viscous damping media 21 relative to the oscillating mass or piston, but smaller than the inside diameter of the cylinder 14 to provide clearance between that piston ring 55 and the cylinder 14. It is thus seen that the term "piston ring" as herein employed for the part 55 does not in all respects have the same significance in the subject transducer environment as the general meaning of that term in the automotive industry, where piston rings typically have the same diameter as the cylinder of an automotive engine in order to provide a tight seal between the piston and cylinder structures, with the piston ring peripherally engaging the inner surface of the automotive cylinder and working therealong at considerable friction.

The illustrated floating seal assembly 41 further includes a ring or annulus 61 about the mounting post 17. The annulus 61 has an inside diameter smaller than the inside diameter of the bore 62 through the pole piece 44, to impede flow of the viscous damping medium through that bore, but larger than the diameter of the post 17 to provide clearance between the annulus 61 and the post 17.

Similarly, the floating seal assembly 41 includes a further ring or annulus 63 having an inside diameter smaller than the clearance at which the bridge rod 22 extends through the mass or piston 13 to impede the flow of the viscous damping medium 21 through the latter clearance, but larger than the diameter of the rod 22 to provide clearance between the annulus and the shaft.

In practice, the clearance between the rings or annuli 55, 61 and 63 and the adjacent structure 14, 17 or 22 may be, for instance, as little as one-half thousandth of an inch or about 10μ up to about five-hundredth of an inch or approximately 1 mm. This by way of example, rather than by way of limitation.

The floating seal assembly 41 further includes a thin circular ring retention plate 65 which is spot welded or otherwise fastened to the pole piece 44, as indicated at 66. The pole piece 44 and attached retainer plate 65 jointly form a ring retaining structure in the mass or piston 13 defining a peripheral channel 67 for receiving part of the piston ring 55 and having an inside diameter smaller than the inside diameter of the piston ring and a height in the axial direction of the assembly larger than the height of the piston ring whereby the piston ring 55 is floating relative to the pole piece 44 and thus relative to the mass or system 13 and cylinder 14.

The annulus retaining structure formed by the pole piece 44 and attached retainer plate 65 also defines an annular chamber 68 for receiving part of the annulus 61. This annular chamber 68 has a diameter larger than the outside diameter of the annulus 61 and a height larger than the height of the annulus 61, whereby that annulus is floating relative to the pole piece 44 and thus relative to the mass or piston 13 and mounting post 17.

The annulus retention structure formed by the pole piece 44 and attached plate 55 further defines another annulus retaining chamber 71 for receiving part of the annulus 63.

The chamber 71 has a diameter larger than the outside diameter of the corresponding annulus 63 and a height larger than the height of that annulus, whereby the annulus 63 is floating relative to the pole piece 44 and thus relative to the mass or piston 13 and spring suspension rod 22.

This floating nature of the rings or annuli 55, 61 and 63 readily excludes any noticeable static and dynamic friction that could detrimentally affect the transducer output signal.

If desired, similar floating seals may be provided in the lower pole pieces 43, or the floating seals may otherwise be distributed among the pole pieces 43 and 44. In either case, the electromagnetic assembly including the bobbins 45 and 46 will sense the oscillation of the mass 13 as damped with the aid of the floating seal assembly 41 impeding flow of the viscous damping medium past the mass 13.

The floating seal assembly 41 may thus be considered as in effect dividing the inside of the cylinder 14 into upper and lower chambers in which the damping medium is constrained except for the very small clearances remaining at the floating seals.

In practice, the mass in the oscillating transducer will exhibit a certain lateral sway despite the transverse rigidity of the spring suspension system. The floating nature of the seals at 55, 61 and 63 permits an accommodation of such sway without scraping, friction or objectionable damping medium flow past the mass or piston. This, in turn, permits the use of air or of another gaseous damping medium in the transducer 10. This not only obviates the need for special expansion chambers, but also removes the low and high temperature limitations, as well as temperature range restrictions, commonly associated with the use of high-viscosity oils and similar liquids in the transducer.

If desired, the transducer 10 may be provided with a hollow-cylindrical cover 73 which may be brazed or welded to the bobbin support cylinder.

As seen in FIG. 1, the cylinder 14 has a first chamber region 74 containing damping fluid on a first side 75 of the mass 13 and a second chamber region 76 containing damping fluid on an opposite second side 77 of the mass. In particular, the mass or piston 13 in the illustrated embodiment divides the cylinder 14 into a first chamber region 74 containing part of the damping medium on a first side 75 of the mass and a second chamber region 76 containing more of the damping medium on an opposite second side 77 of the mass 13.

According to the subject invention, a conduit 79 is provided or extends through the mass 13 for interconnecting the first and second chamber regions 74 and 76 for the flow of damping fluid upon oscillation of the mass. In other words, the first and second chamber regions 74 and 76 are interconnected through the conduit 79, the mass 13 is oscillated, and damping fluid is flowed through the conduit 79 with such oscillating mass.

Also according to the illustrated preferred embodiment of the subject invention, the conduit 79 is maintained stationary relative to the oscillating mass 13 by means of at least the mounting plate 15 connected thereto.

Further according to the illustrated preferred embodiment of the subject invention, the conduit 79 is part of the means for mounting the spring suspension 21 of the transducer or, in other words, for mounting the mass 13 with the spring suspension 21.

In particular, and pursuant to the best mode presently contemplated for carrying the subject invention into effect, the damping fluid conduit 79 is realized by means of the central mounting post 17 which extends through the first bore 62 of the mass or piston 13, having a smaller diameter than that first bore. To implement this concept, the mounting post 17 may either be tubular or otherwise have an axial second bore 82 extending preferably coaxially with the first bore 62 (e.g. see FIG. 4).

The second bore 82 communicates via apertures 83 and 84 in the post 17 with the first and second chamber regions 74 and 76 for the flow of damping fluid through the second bore 82 upon oscillation of the mass 13. The conduit 79 thus in accordance with the illustrated preferred embodiment of the subject invention extends through, or is formed by, the mounting post 17.

Once the conduit 79 has been established, the damping of the oscillating mass 13 may be increased by restricting the conduit 79 or bore 82 in effective cross-section. An example of a means for increasing the damping of the oscillating mass 13 is shown at 86 in FIG. 1. Pursuant to a further preferred embodiment of the subject invention, the means 86 is capable of adjusting the damping of the oscillating mass 13 by adjusting the flow of damping fluid through the mounting post 17 or conduit 79.

In particular, and pursuant to the best mode presently contemplated for carrying the subject invention into effect, the means 86 is a valve connected to the conduit 79 for adjusting the flow of damping fluid between the first and second chamber regions 74 and 76 of the damping fluid containing transducer cylinder 14. The valve 86, in conjunction with the conduit 79, thus serves as a means for controlling damping of the oscillation of the mass or piston 13 by selectively adjusting flow of damping fluid between the first and second chamber regions 74 and 76.

The valve 86 according to the illustrated preferred embodiment of the subject invention is capable of exerting its control function not only in the sense of a decrease of the damping of the mass 13 but, in contrast to the best prior solution proposed in the above mentioned Elswood patent, also in the sense of an increase of the damping of the mass 13. The above mentioned wastage of the most advanced prior approach is thus avoided and damping can be adjusted as desired or necessary without the need of having to go through one or more disassembly and reassembly procedures, as was the case with prior approaches.

By way of preferred implementation, the valve 86 is provided by a screw 87 valve which is threaded into the upper part or top of the tube 79, and which preferably has a slot or hexagonal cavity for engagement by a manually operated screw driver or wrench.

The screw 87 preferably has a shaft 88 which extends into the conduit bore 82 for a sufficient distance to be able to selectively obscure or move into registry with the conduit aperture 83 upon rotation of the screw 87. As shown, the valve shaft 88 may have a tapered or pointed tip for providing a gradual closing and gradual opening of the conduit aperture 83.

Flow of damping fluid between the chamber regions 74 and 76 may thus simply be adjusted by selective clockwise and counterclockwise rotation of the screw 87. Where vibration may present problems, a locking nut may be associated with the screw 87.

The conduit aperture 83 is located in the chamber region 74 well above the upper amplitude of the mass 13. Similarly, the aperture 84 is located in the chamber region 76 well below the lower amplitude of the mass 13.

The piston ring 67 and annuli 61 and 63 may be dispensed with in the broad concept of the subject invention. However, the damping regulation features of the subject invention typically are most needed when such piston ring and annuli are present, since the flow of fluid between the chamber regions 74 and 76 is then most restricted. Accordingly, the annulus 61 preferably extends around the conduit 79 as shown in FIG. 4 and as described above with respect to the post 17, in order to impede the flow of the viscous damping medium past the conduit 79. As before, the annulus 61 about the post has an inside diameter smaller than the inside diameter of the first bore 62 for impeding the flow of the viscous damping medium through that first bore, but larger than the diameter of the post to provide clearance between the annulus 61 and that post 17.

In principle, either one of the mass 13 and cylinder 14 may be magnetized, and means for generating an electric transducer signal upon oscillation of the mass may include electromagnetic winding means at the other of the mass 13 and cylinder 14. Also, the utility of the subject invention is not limited to transducers which generate electric signals but may also be applied to seismic or other transducer systems employing forms of energy other than electricity.

The subject extensive disclosure will suggest or render apparent to those skilled in the art various modifications and variations within the spirit and scope of the subject invention.

We claim:

1. In a transducer having a mass oscillating in the manner of a piston in a cylinder having a first chamber region containing damping fluid on a first side of said mass and a second chamber region containing damping fluid on an opposite second side of said mass, the improvement comprising:
  a conduit through said mass interconnecting said first and second chamber regions for the flow of damping fluid upon oscillation of said mass; and
  valve means connected to said conduit for adjusting the flow of damping fluid between said first and second chamber regions.

2. In a method of operating a transducer having a mass oscillating in the manner of a piston in a cylinder having a first chamber region containing damping fluid on a first side of said mass and a second chamber region containing damping fluid on an opposite second side of said mass, the improvement comprising in combination the steps of:
  providing a conduit through said mass;
  interconnecting said first and second chamber regions through said conduit;
  oscillating said mass and flowing damping fluid through said conduit with said oscillating mass;
  increasing the damping of said oscillating mass by restricting said conduit in effective cross-section; and
  generating electric signals in response to oscillation of said mass.

3. In a method of operating a transducer having a mass oscillating in the manner of a piston in a cylinder having a first chamber region containing damping fluid on a first side of said mass and a second chamber region containing damping fluid on an opposite second side of said mass, the improvement comprising in combination the steps of:
  providing a conduit through said mass;
  interconnecting said first and second chamber regions through said conduit;
  oscillating said mass and flowing damping fluid through said conduit with said oscillating mass;

adjusting the damping of said oscillating mass by adjusting the flow of damping fluid through said conduit; and generating electric signals in response to oscillation of said mass.

4. A method as claimed in claim 2 or 3, wherein:
said conduit is maintained stationary relative to said oscillating mass.

5. A method as claimed in claim 2 or 3, including the steps of:
providing said mass with a spring suspension; and
mounting said spring suspension with said conduit.

6. A method as claimed in claim 2 or 3, including the steps of:
magnetizing one of said mass and cylinder; and
providing the other of said mass and cylinder with electromagnetic winding means to generate an electric transducer signal upon oscillation of said mass.

7. In a transducer having a mass oscillating in the manner of a piston in a cylinder having a first chamber region containing damping fluid on a first side of said mass and a second chamber region containing damping fluid on an opposite second side of said mass, the improvement comprising:
a conduit through said mass interconnecting said first and second chamber regions for the flow of damping fluid upon oscillation of said mass;
means connected to said conduit for maintaining said conduit stationary relative to said oscillating mass; and
means connected to said mass for generating electric signals in response to oscillation of said mass.

8. In a transducer having a mass oscillating in the manner of a piston in a cylinder having a first chamber region containing damping fluid on a first side of said mass and a second chamber region containing damping fluid on an opposite second side of said mass, the improvement comprising:
a conduit through said mass interconnecting said first and second chamber regions for the flow of damping fluid upon oscillation of said mass;
means for increasing the damping of said oscillating mass, including means for restricting said conduit in effective cross-section; and
means connected to said mass for generating electric signals in response to oscillation of said mass.

9. In a transducer having a mass oscillating in the manner of a piston in a cylinder having a first chamber region containing damping fluid on a first side of said mass and a second chamber region containing damping fluid on an opposite second side of said mass, the improvement comprising:
a conduit through said mass interconnecting said first and second chamber regions for the flow of damping fluid upon oscillation of said mass;
means for adjusting the damping of said oscillating mass, including means for adjusting the flow of damping fluid through said conduit; and
means connected to said mass for generating electric signals in response to oscillation of said mass.

10. A transducer as claimed in claim 8 or 9, including:
means connected to said conduit for maintaining said conduit stationary relative to said oscillating mass.

11. A transducer as claimed in claim 7, 8 or 9, including:
a spring suspension for said mass; and
means including said conduit for mounting said mass with said spring suspension.

12. A transducer as claimed in claim 7, 8 or 9, including:
means for magnetizing one of said mass and cylinder; and
means for generating an electric transducer signal upon oscillation of said mass, including electromagnetic winding means at the other of said mass and cylinder.

13. A transducer as claimed 7, 8 or 9, including:
valve means connected to said conduit for adjusting the flow of damping fluid between said first and second chamber regions.

14. A vibration transducer comprising in combination:
cylinder means for enclosing a viscous damping medium;
piston means in said cylinder means having an outside diameter smaller than the inside diameter of said cylinder means, having a seismic mass, and dividing said cylinder means into a first chamber region containing part of said damping medium on a first side of said mass and a second chamber region containing more of said damping medium on an opposite second side of said mass;
means for mounting said piston mass for axial oscillation in said cylinder means;
means for damping said oscillation of the piston means with said viscous damping medium, including a piston ring having an outside diameter larger than the outside diameter of said piston means to impede flow of said viscous damping medium relative to said oscillating piston means, but smaller than the inside diameter of said cylinder means to provide clearance between said piston ring and said cylinder means;
means for controlling said damping including a conduit through said piston means interconnecting said first and second chamber regions for the flow of damping fluid upon oscillation of said mass, and means connected to said conduit for selectively adjusting the damping fluid flow through said conduit; and
means operatively associated with said piston means for sensing said damped oscillation.

15. A vibration transducer as claimed in claim 14, wherein:
said piston means have a bore;
said conduit extends through said bore and has a diameter smaller than the diameter of said bore.

16. A vibration transducer as claimed in claim 15, wherein:
said damping means include an annulus about said conduit having an inside diameter smaller than the inside diameter of said bore to impede flow of said viscous damping medium past said conduit, but larger than said diameter of said conduit to provide clearance between the annulus and said conduit.

17. A vibration transducer comprising in combination:
cylinder means for enclosing a viscous damping medium;
piston means in said cylinder means having an outside diameter smaller than the inside diameter of said cylinder means, having a first bore, and having a seismic mass, and dividing said cylinder means into a first chamber region containing part of said damping medium on a first side of said mass and a second chamber region containing more of said damping medium on an opposite second side of said mass;

means including a post extending through said first bore for mounting said piston means for axial oscillation in said cylinder means;

means for damping said oscillation of the piston means with said viscous damping medium, including a piston ring having an outside diameter larger than the outside diameter of said piston means to impede flow of said viscous damping medium relative to said oscillating piston means, but smaller than the inside diameter of said cylinder means to provide clearance between said piston ring and said cylinder means;

means for controlling said damping including a second bore through said post communicating via apertures in said post with said first and second chamber regions for the flow of damping fluid through said second bore upon oscillation of said mass, and means connected to said conduit for selectively adjusting the damping fluid flow through said second bore; and means operatively associated with said piston means for sensing said damped oscillation.

18. A vibration transducer as claimed in claim 17, wherein:

said damping means include an annulus about said post having an inside diameter smaller than the inside diameter of said first bore to impede flow of said viscous damping medium through said first bore, but larger than said diameter of the post to provide clearance between the annulus and the post.

19. A vibration transducer comprising in combination:

cylinder means for enclosing a viscous damping medium;

piston means in said cylinder means having an outside diameter smaller than the inside diameter of said cylinder means, having a first bore, and having a seismic mass, and dividing said cylinder means into a first chamber region containing part of said damping medium on a first side of said mass and a second chamber region containing more of said damping medium on an opposite second side of said mass;

means including a post extending through said first bore for mounting said piston means for axial oscillation in said cylinder means and including spring suspension means being flexible in an axial direction in said cylinder means and having maximum stiffness at right angles to said axial direction to retain said piston means against radial movement relative to said cylinder means;

means for controlling damping of said oscillation of the piston means with said viscous damping medium including a conduit between said first and second chamber regions extending through said post, and means connected to said conduit for selectively adjusting flow of damping fluid between said first and second chamber regions; and means operatively associated with said piston means for sensing said damped oscillation.

20. A vibration transducer as claimed in claim 14, 15, 16, 17, 18 or 19, wherein:

said piston means include a magnet and spaced pole pieces; and said sensing means include electromagnetic bobbin means on said cylinder means.

21. A vibration transducer as claimed in claim 14, 15, 16, 17 or 19 wherein:

said adjusting means include adjustable valve means.

22. In a method of operating a transducer having a mass oscillating in an enclosure having a first chamber region containing damping fluid on a first side of said mass and a second chamber region containing damping fluid on an opposite second side of said mass, the improvement comprising in combination the steps of:

providing a spring suspension for said mass;

providing a mounting post for mounting said mass with said spring suspension in said enclosure;

providing said mounting post with an axial bore communicating with said first and second chamber regions for the flow of damping fluid between said first and second chamber regions upon oscillation of said mass;

connecting a valve to said bore for adjusting flow of damping fluid between said first and second chamber regions through said axial bore; and controlling damping of the oscillation of said mass by adjusting said valve.

23. A method as claimed in claim 22, wherein:

said mounting post is maintained stationary relative to said oscillating mass.

24. In a vibration transducer, the improvement comprising in combination:

means for enclosing a viscous damping medium;

means including a mass in said enclosing means for dividing said enclosing means into a first chamber region containing part of said damping medium on a first side of said mass and a second chamber region containing more of said damping medium on an opposite second side of said means;

a spring suspension for said mass;

means for mounting said mass with said spring suspension for oscillation, including in said enclosing means a mounting post having an axial bore communicating with said first and second chamber regions for the flow of damping medium between said first and second chamber regions upon oscillation of said mass; and means for controlling damping of the oscillation of said mass including an adjustable valve connected to said bore for selectively adjusting flow of damping medium between said first and second chamber regions through said axial bore.

25. A transducer as claimed in claim 24, including:

means connected to said mounting post for maintaining said mounting post stationary relative to said mass during said oscillation.

* * * * *